(12) United States Patent
Cornelisson et al.

(10) Patent No.: US 9,678,291 B2
(45) Date of Patent: Jun. 13, 2017

(54) CABLE SEALING UNIT WITH SEALED ACTUATOR

(71) Applicant: TYCO ELECTRONICS RAYCHEM BVBA, Kessel-Lo (BE)

(72) Inventors: Kurt Cornelisson, Hulshout (BE); Ronnie Rosa Georges Liefsoens, Tessenderlo (BE); Robert Vanhentenrijk, Winksele (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 15/107,861

(22) PCT Filed: Dec. 22, 2014

(86) PCT No.: PCT/EP2014/078970
§ 371 (c)(1),
(2) Date: Jun. 23, 2016

(87) PCT Pub. No.: WO2015/097141
PCT Pub. Date: Jul. 2, 2015

(65) Prior Publication Data
US 2016/0320580 A1 Nov. 3, 2016

Related U.S. Application Data (60) Provisional application No. 61/920,327, filed on Dec. 23, 2013.

(51) Int. Cl.
*G02B 6/44* (2006.01)
(52) U.S. Cl.
CPC .................. *G02B 6/4444* (2013.01)

(58) Field of Classification Search
None
See application file for complete search history.

(56) References Cited

U.S. PATENT DOCUMENTS 5,313,019 A 5/1994 Brusselmans
5,455,391 A * 10/1995 Demesmaeker .... B25B 23/0064
174/77 R (Continued)

FOREIGN PATENT DOCUMENTS

EP 0442941 1/1995
EP 0587616 7/1996

(Continued)

OTHER PUBLICATIONS

International Search Report and Written Opinion for International Application No. PCT/EP2014/078970 mailed Mar. 30, 2015 (7 pages).

*Primary Examiner* — Hemang Sanghavi
(74) *Attorney, Agent, or Firm* — Merchant & Gould P.C.

(57) ABSTRACT

A cable sealing unit has an actuator that is sealed to inhibit the intrusion of debris from compromising the working components of the actuator. A sealant can be pressurized using an actuator that includes a handle threaded over a shaft to compress a spring. A sealing arrangement is disposed at the actuator to prevent a particulate contaminant, such as sand, from damaging the threads of the actuator. The sealing arrangement also can prevent the spring from being exposed to particulate contaminants. The sealing arrangement can include one or more sealing members disposed on the handle and/or the shaft.

9 Claims, 8 Drawing Sheets (56) References Cited

U.S. PATENT DOCUMENTS

| | | | | |
|---|---|---|---|---|
| 2012/0235363 A1* | 9/2012 | Vanhentwnrijk | .... | G02B 6/4444 |
| | | | | 277/627 |
| 2013/0315551 A1* | 11/2013 | Claessens | ............ | G02B 6/4444 |
| | | | | 385/136 |
| 2014/0259606 A1* | 9/2014 | Hedger | ................ | F16J 15/3204 |
| | | | | 29/428 |
| 2015/0155696 A1* | 6/2015 | Coenegracht | ........ | G02B 6/4444 |
| | | | | 174/564 |

FOREIGN PATENT DOCUMENTS

| EP | 2330707 | 6/2011 |
|---|---|---|
| EP | 2674799 | 12/2013 |
| WO | 2014/078970 | 8/2014 |

* cited by examiner

CABLE SEALING UNIT WITH SEALED ACTUATOR

CROSS-REFERENCE TO RELATED APPLICATION(S)

This is a National Stage of PCT/EP2014/078970, filed on 22 Dec. 2014, which claims benefit of U.S. Patent Application Ser. No. 61/920,327 filed on Dec. 23, 2013 the disclosures of which are incorporated herein by reference. To the extent appropriate, a claim of priority is made to each of the above disclosed applications.

TECHNICAL FIELD

The present disclosure relates generally to sealing structures. More particularly, the present disclosure relates to techniques for sealing cable entry points of enclosures within telecommunications systems.

BACKGROUND

Telecommunications systems typically employ a network of telecommunications cables capable of transmitting data and voice signals over relatively long distances. The telecommunications cables can include fiber optic cables, electrical cables, or combinations of electrical and fiber optic cables.

A typical telecommunications network also includes telecommunications enclosures integrated throughout the network. The telecommunications enclosures are adapted to house and protect telecommunications components such as splices, termination panels, power splitters, and wavelength division multiplexers. It is often preferred for the telecommunications enclosures to be re-enterable. The term "re-enterable" means that the telecommunications enclosures can be re-opened to allow access to the telecommunications components housed therein without requiring the removal and destruction of the telecommunications enclosures.

Telecommunications enclosures are typically sealed to inhibit the intrusion of moisture or other contaminants. Pressurized gel-type seals have been used to effectively seal the locations where telecommunications cables enter and exit telecommunications enclosures. Example pressurized gel-type seals are disclosed by document EP 0442941B1 and document EP 0587616 B1, the disclosures of which are hereby incorporated herein by reference. Both of these documents disclose gel-type cable seals that are pressurized through the use of threaded actuators. While pressurized cable seals have generally proven to be effective, improvements in this area are still needed.

SUMMARY

Aspects of the present disclosure relate to cable sealing units having constructions suitable for effective operation in harsh, sand-laden environments.

Another aspect of the present disclosure relates to a cable sealing unit having an actuator that is sealed to inhibit the intrusion of debris, such as sand, from compromising the working components of the actuator.

Still another aspect of the present disclosure relates to a cable sealing unit including a volume of sealant (e.g., gel) that is pressurized by an actuator. In certain examples, the actuator can include a threaded shaft, an actuator handle that threads on the threaded shaft, and a spring. The spring is compressed by threading the actuator handle onto the threaded shaft, thereby applying a spring load to the volume of sealant, which causes the volume of sealant to be pressurized. The actuator can include a sealing arrangement that prevents a particulate contaminant, such as sand, from damaging the threads of the actuator. In certain examples, the sealing arrangement also prevents the spring from being exposed to particulate contaminants.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventions and inventive concepts upon which the examples disclosed herein are based.

DETAILED DESCRIPTION

In general, the disclosure relates to a sealing unit that secures cables (e.g., drop cables, blown fiber tubes, etc.) at one or more ports of a cable closure. The sealing unit includes a volume of sealant (e.g., a gel block) sealing around the cables at the ports to inhibit ingress of contaminants into the closure. Throughout the disclosure, the cables will be referred to as "drop cables" for convenience. It will be understood, however, that any type of cables can be sealed by the sealing unit. In certain examples, a retention block inhibiting axial pull-out of the cables from the closure can be coupled to the sealing unit.

Figure 1:
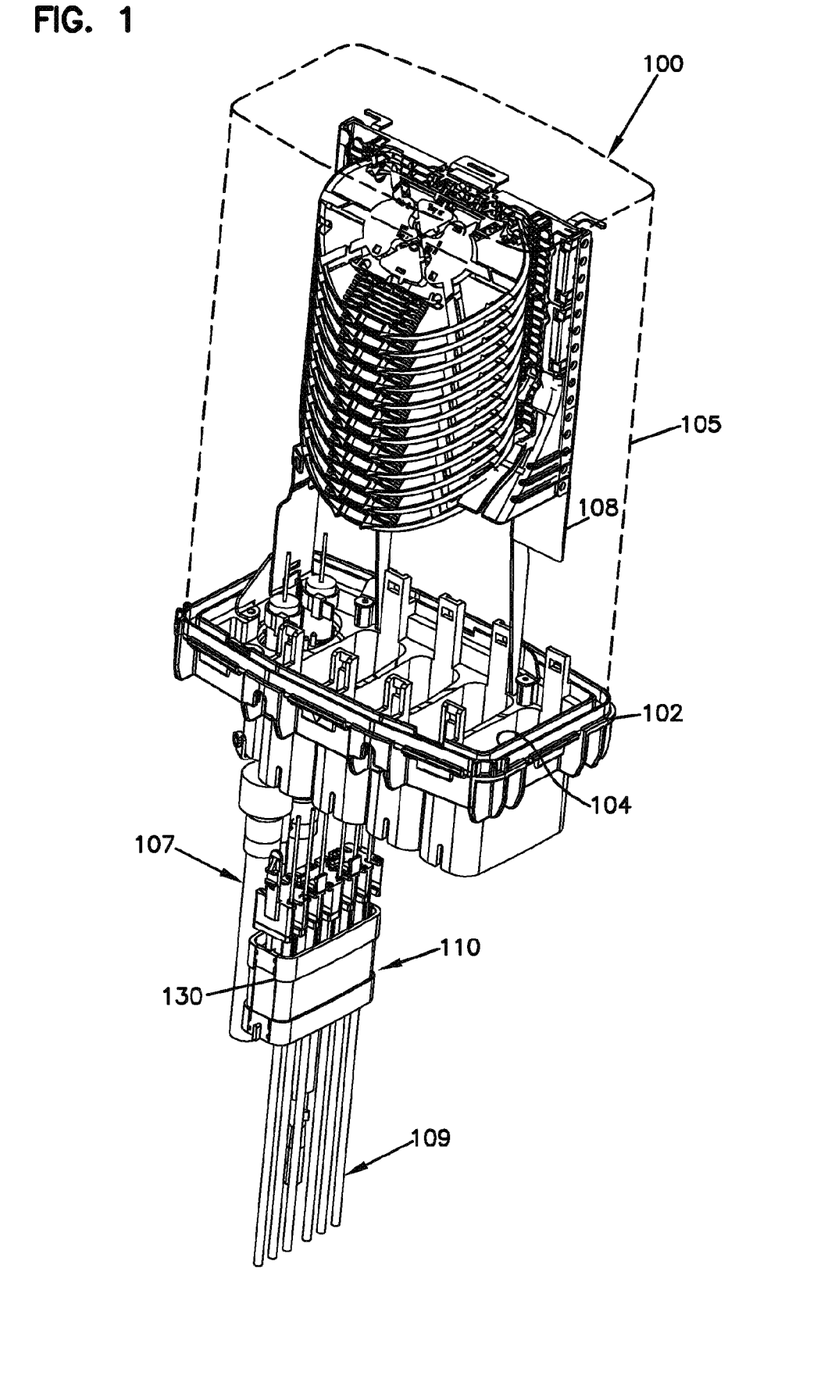
FIG. 1 illustrates an enclosure in accordance with the principles of the present disclosure, the enclosure includes a housing and a cable sealing unit for sealing cable entry points to the housing.

Referring to FIG. 1, one example cable closure 100 receiving one or more feeder cables 107 and one or more drop cables 109 is shown. The cable closure 100 includes a base 102 that is configured to couple to a dome 105 (shown schematically with dashed lines). A gasket or other seal extends around a periphery of the base 102 and/or the open end of the dome 105 to provide sealing between the base 102 and the dome 105. A cable organizer 108 is attached to the base 102 and is enclosed by the dome 105 when the dome 105 is mounted to the base 102. One or more optical components (e.g., fiber management trays, bend radius limiters, routing guides, etc.) can be mounted to the cable organizer 108.

The base 102 defines at least one feeder cable port and at least one drop cable port 104. In the example shown, the base 102 defines four drop cable ports 104. In other implementations, however, the closure 100 can receive blown fiber tubes or other types of optical cables at the cable port 104. Two feeder cables 107 are shown held at the feeder cable port in the base 102 of FIG. 1. The drop cable ports 104 are shown empty.

The sealing unit 110 includes a volume of sealant 130. The drop cables 109 are routed through the sealing unit 110 and sealed by the sealant 130. For example, the sealant 130 seals around the outer jackets of the drop cables 109 when the sealing unit 110 is actuated. In some implementations, the sealing unit 110 is configured to be releasably engaged to the base 102 at one of the drop cable ports 104. For example, in FIG. 1, the sealing unit 110 is shown positioned outside of one of the drop cable ports 104 ready to be inserted therein. The sealant 130 seals against an interior perimeter of the respective drop cable port 104 when the sealing unit 110 is actuated. In other implementations, however, the base 102 can define a single opening at which the sealing unit 110 mounts and seals the enclosure 100.

In certain examples, the sealing unit 110 includes or is coupled to a retention arrangement 120 at which the drop cables 109 are held in axially fixed positions. In certain examples, the drop cables 109 are retained by their outer jackets at the retention arrangement 120 as will be described in more detail herein. Optical fibers 111 of the drop cables 109 protrude from the retention arrangement 120 towards the closure 100 (see FIG. 1). Additional details regarding the retention block and the closure can be found in U.S. Provisional Application No. 61/892,768, filed Oct. 18, 2013, and titled "Separable Sealing and Retention Arrangement," the disclosure of which is hereby incorporated herein by reference.

Figure 2:
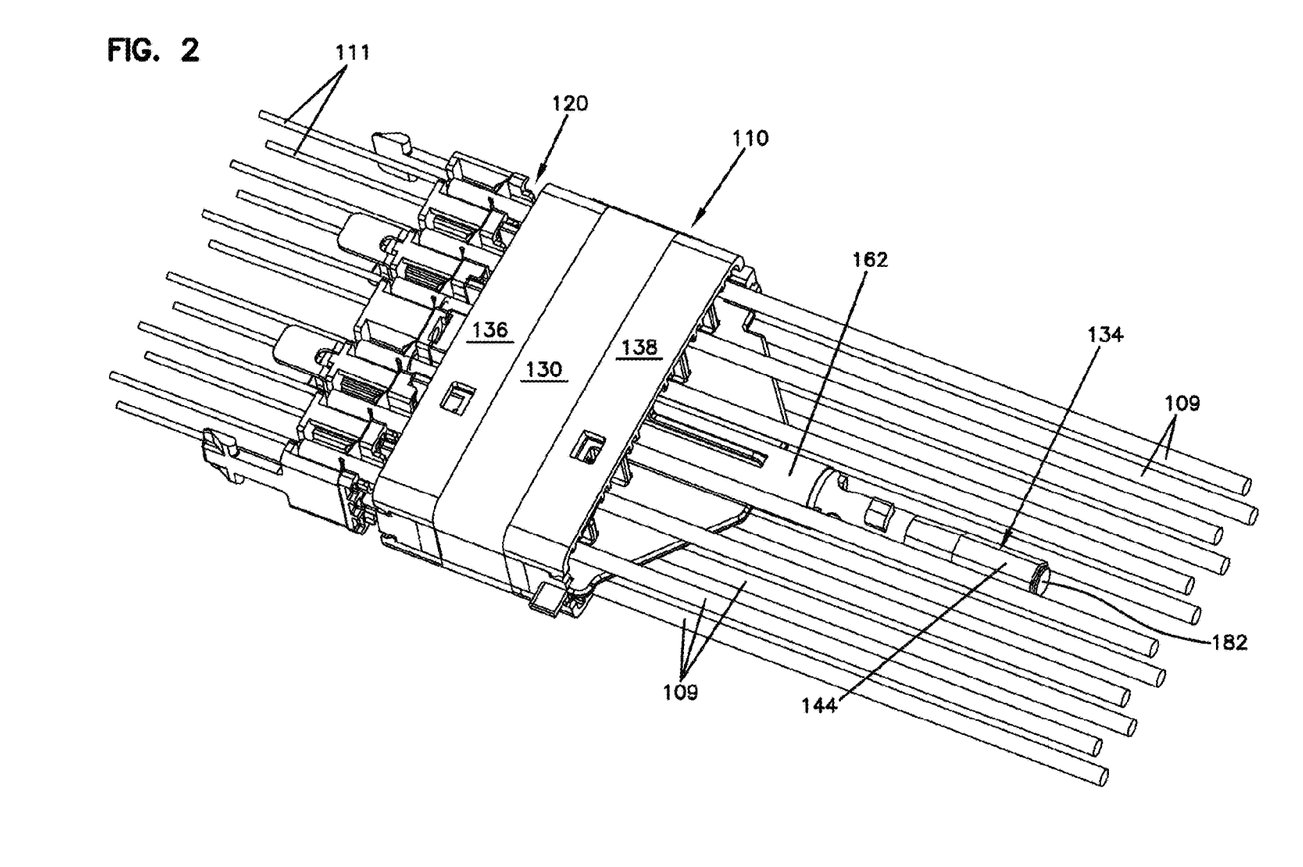
FIG. 2 is a perspective view of an example cable sealing unit suitable for use with the enclosure of FIG. 1, the example cable sealing unit shown in a non-compressed state.
Figure 3:
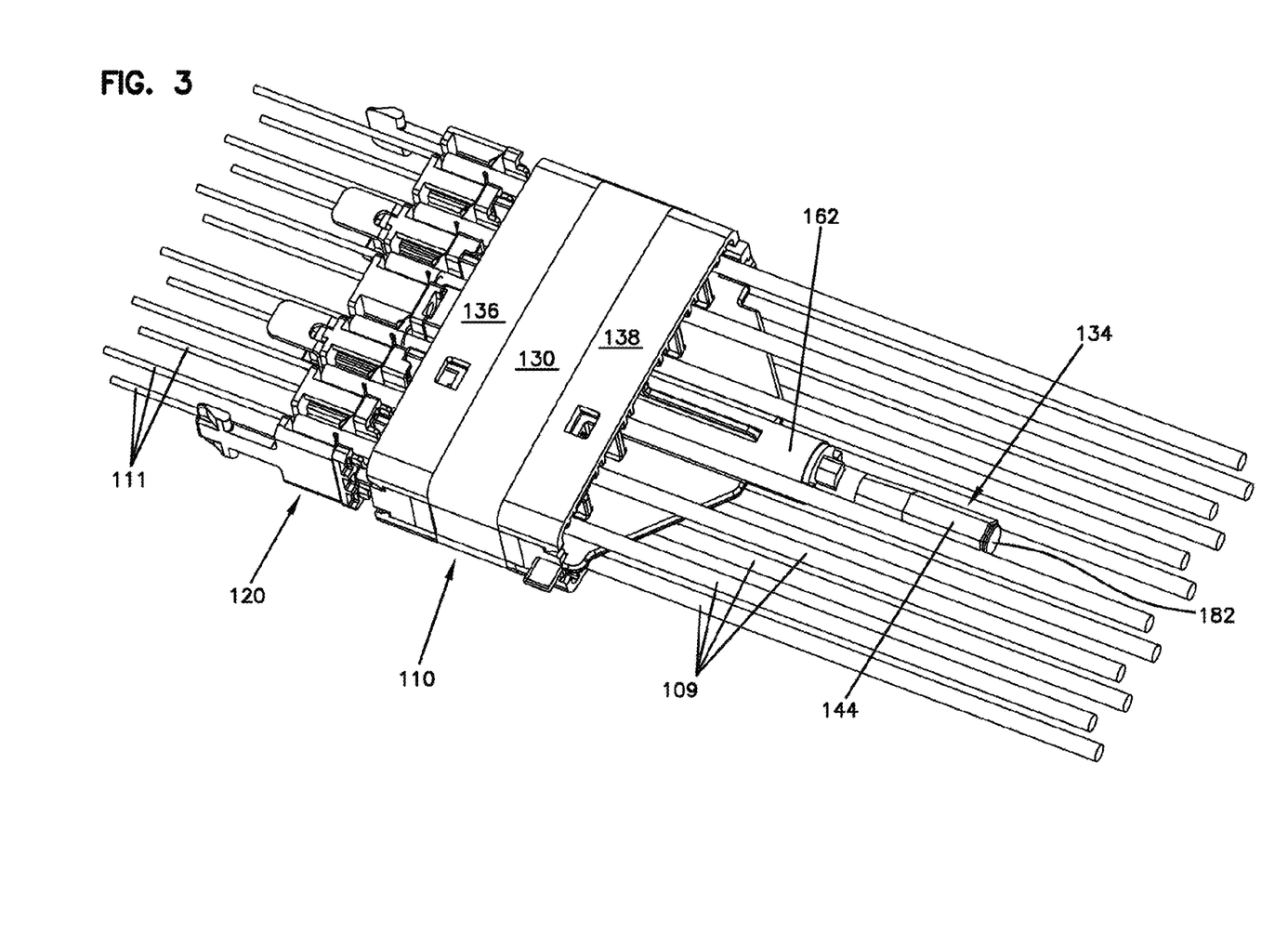
FIG. 3 is a perspective view of the cable sealing unit of FIG. 2 in a compressed state.
Figure 4:
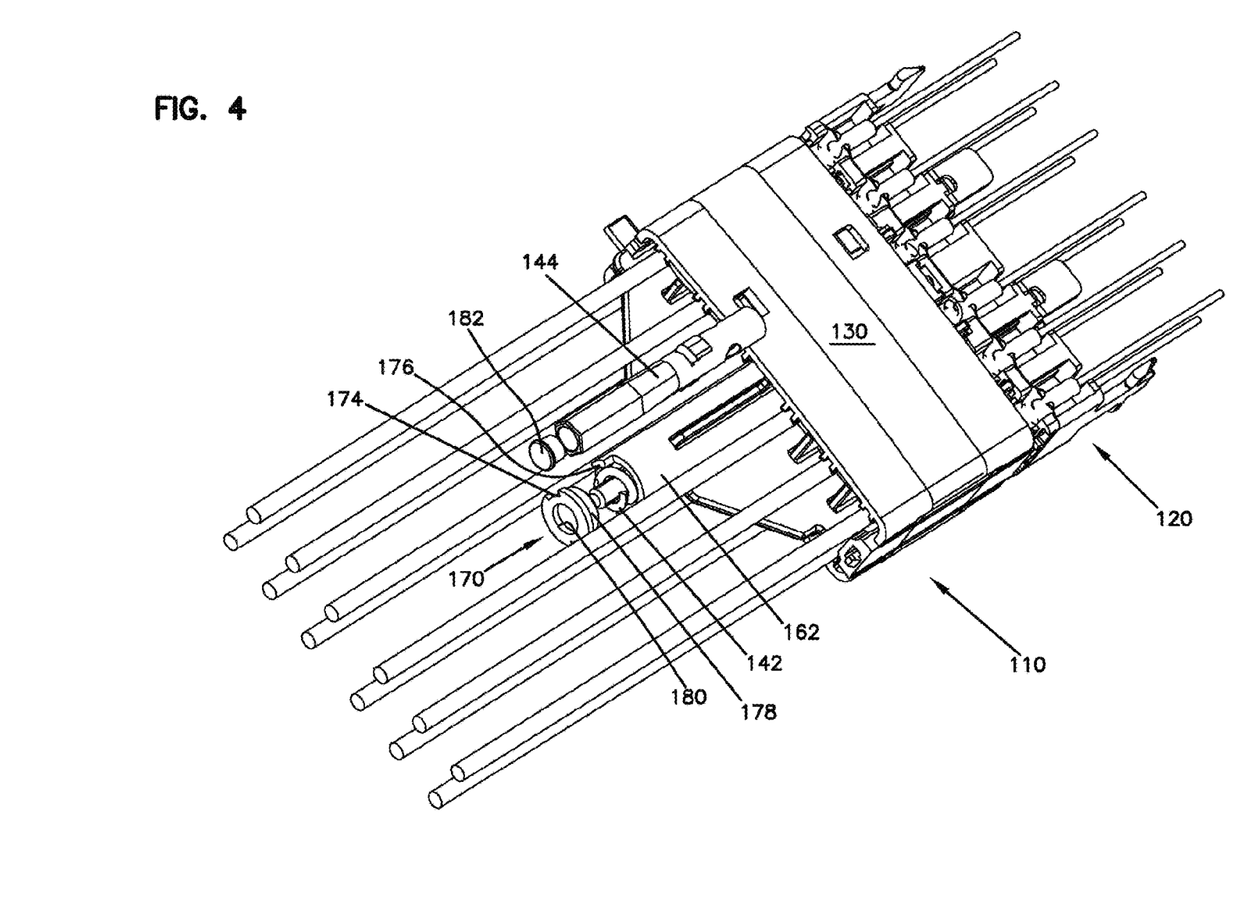
FIG. 4 is a perspective, partially exploded view of the cable sealing unit of FIG. 2.
Figure 5:
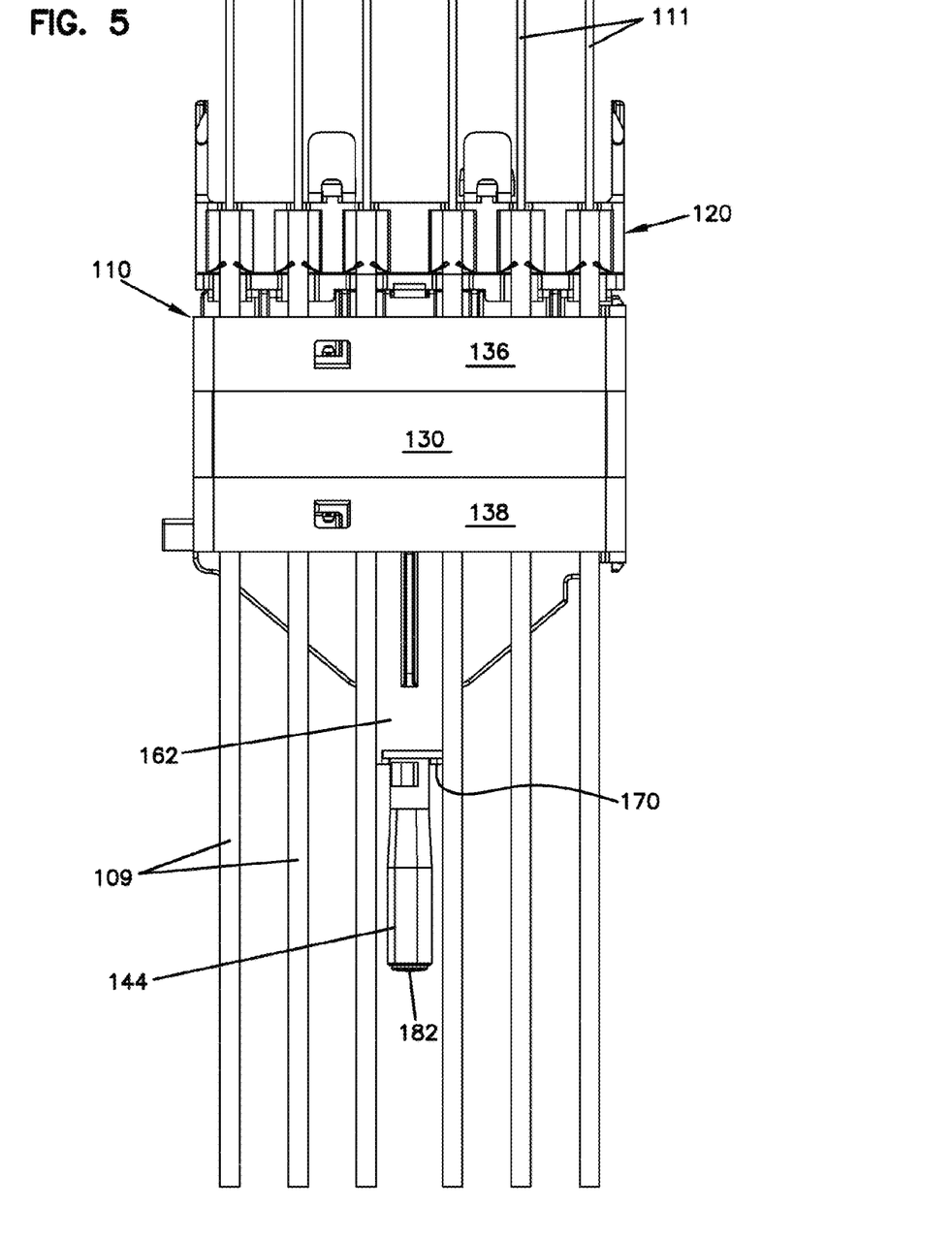
FIG. 5 is a plan view of the cable sealing unit of Fi FIG. 2.
Figure 6:
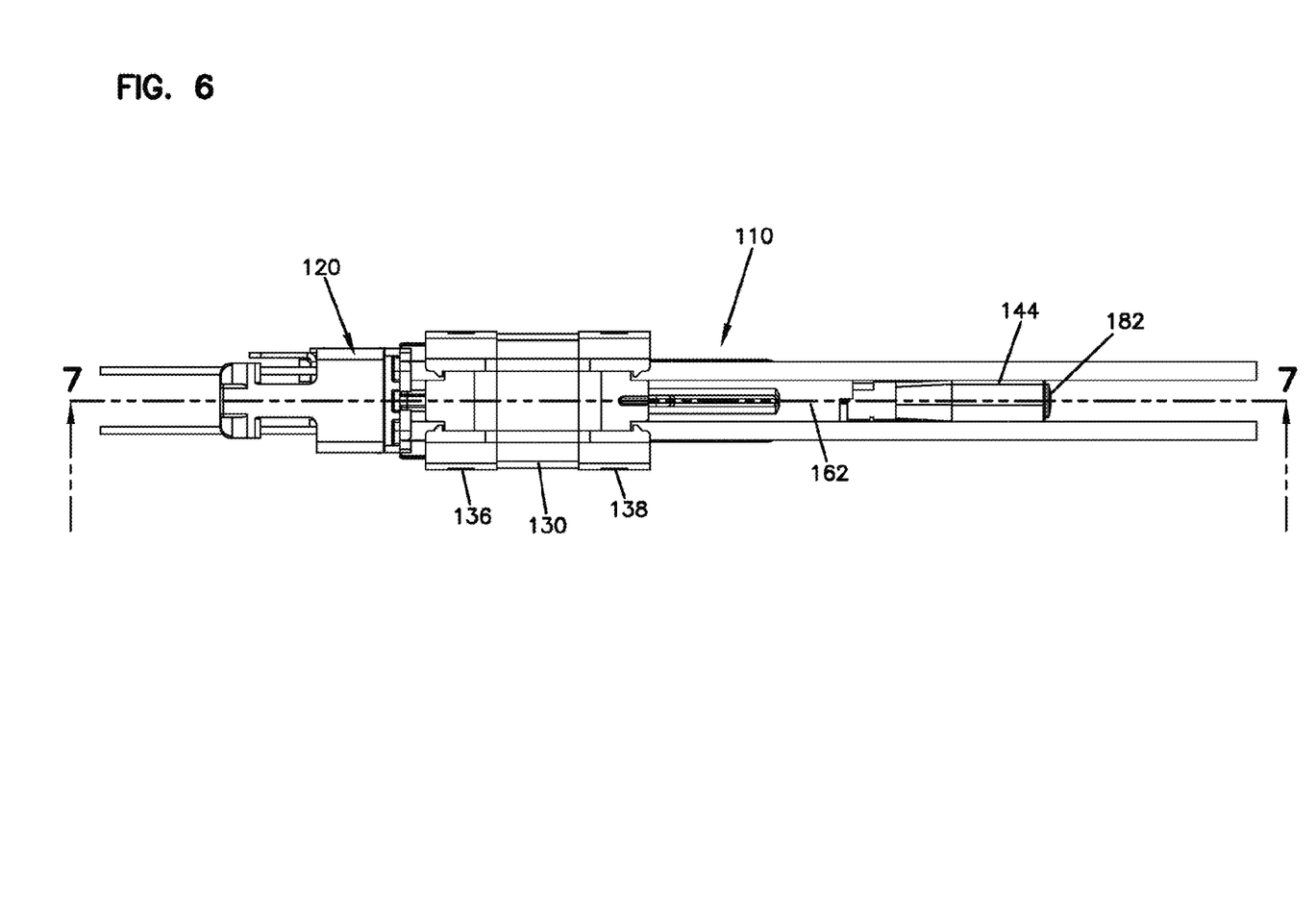
FIG. 6 is a side view of the cable sealing unit of FIG. 2.
Figure 7:
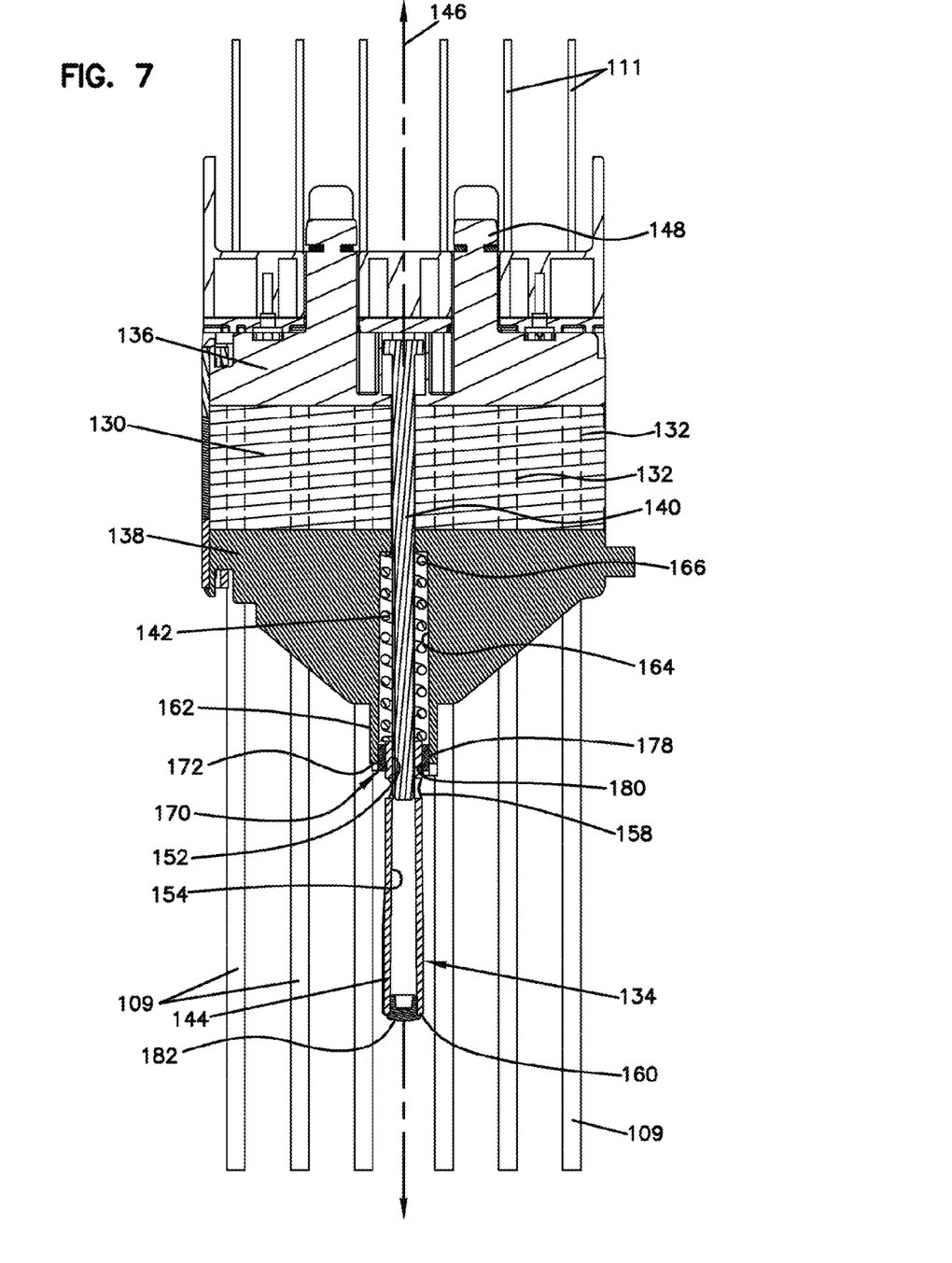
FIG. 7 is a cross-sectional view of the cable sealing unit of FIG. 2 depicted in a non-actuated state.
Figure 8:
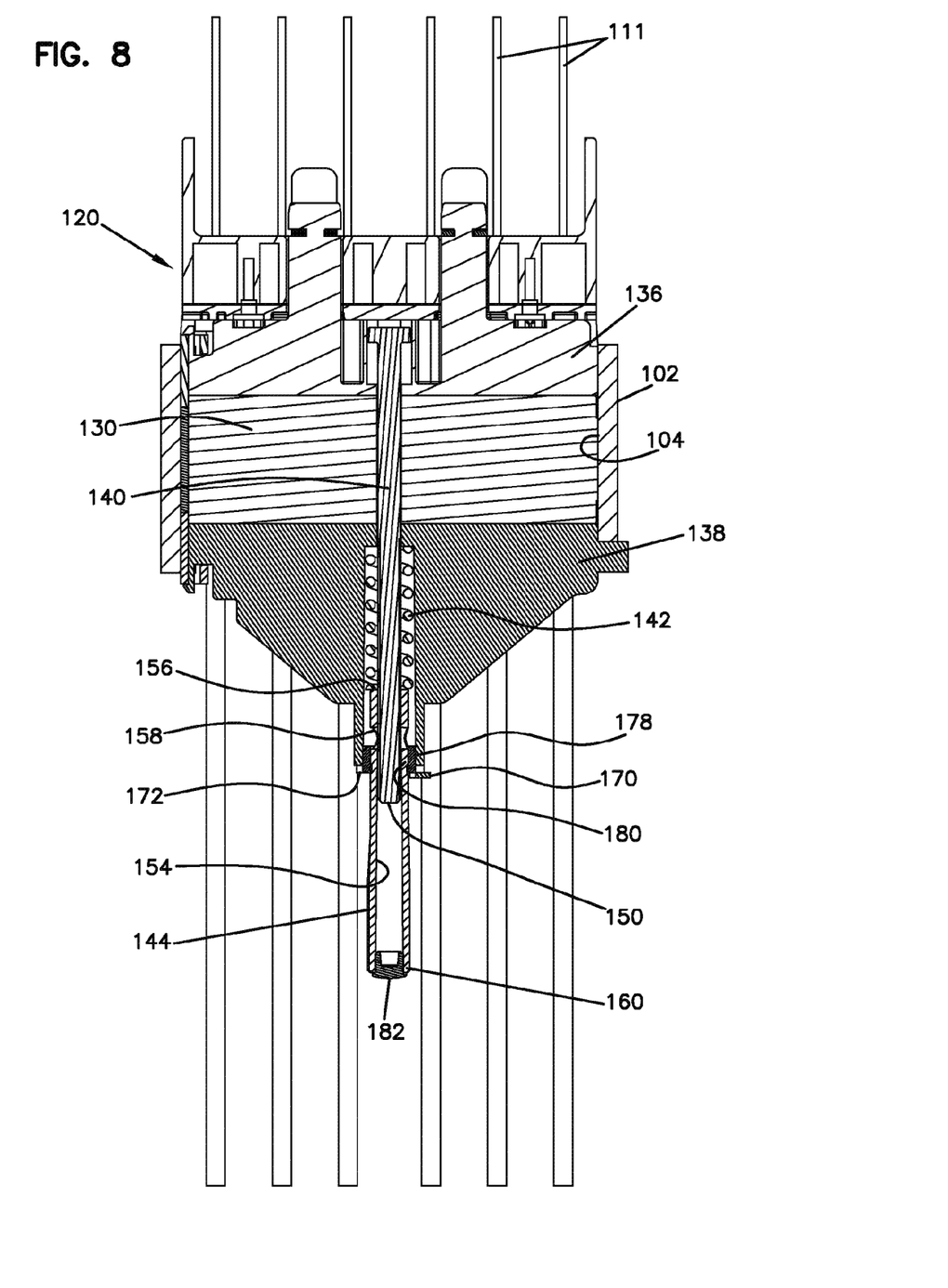
FIG. 8 is a cross-sectional view of the cable sealing unit of FIG. 2 depicted in an actuated state.

FIG. 2 shows an example sealing unit 110 including a volume of sealant 130 (e.g., gel or type of sealing material) that defines a plurality of cable ports 132 (see in hidden line at FIG. 7). Once pressurized, the sealant 130 is configured for providing seals about structures (e.g., cables, plugs, etc.) routed through the cable ports 132 and is also configured for providing a peripheral seal with the base 102 at the drop cable port 104. In this way, the sealant 130 effectively seals the drop cable port 104, thereby inhibiting moisture or contaminants from entering the closure 100. The sealing unit 110 further includes an actuator 134 for pressurizing the sealant 130 within the drop cable port 104. The actuator 134 includes inner and outer pressurization structures 136, 138 (e.g., plates, members, bodies, etc.) between which the sealant 130 is located. The actuator 134 further includes a threaded shaft 140 (see FIGS. 7 and 8), a spring 142 (see FIGS. 7 and 8) and an actuator handle 144 (see FIGS. 7 and 8) that cooperate to force the inner and outer pressurization structures 136, 138 together, thereby causing the sealant 130 to be pressurized. FIG. 7 shows the sealant 130 in a non-pressurized state and FIG. 8 shows the sealant 130 in a pressurized state.

Referring to FIG. 7, the threaded shaft 140 is elongated along an axis 146 and includes opposite first and second ends 148, 150. The first end 148 is anchored to the inner pressurization structure 136 by an anchoring configuration that prevents the shaft 140 from rotating about the axis 146 relative to the inner and outer pressurization structures 136, 138. The second end 150 of the shaft 140 is preferably threaded and the actuator handle 144 is threaded on the second end 150 of the shaft 140. The actuator handle 144 includes an internally threaded portion 152 and an internally non-threaded portion 154. The internally threaded portion 152 is located adjacent a first end 156 of the actuator handle 144 and is threaded on the second end 150 of the shaft 140. The actuator handle 144 defines side openings 158 that extend through a side wall of the actuator handle 144 at a location between the internally threaded portion 152 and the internally non-threaded portion 154. The actuator handle 144 also includes a second end 160 positioned opposite from the first end 156.

Referring to FIGS. 2-8, the outer pressurization structure 138 defines a sleeve 162 that projects outwardly from a main body of the outer pressurization structure 138. The sleeve 162 defines a spring receptacle 164 in which the spring 142 is mounted. As shown best at FIG. 7, the shaft 140 extends from the inner pressurization structure 136 through the sealant 130, through the outer pressurization structure 138, and through the sleeve 162 to reach the actuator handle 144. The spring 142 is positioned about the shaft 140 and is captured within the spring receptacle 164 between the first end 156 of the actuator handle 144 and a shoulder 166 defined by the outer pressurization structure 138. The shaft 140, the spring 142, and the actuator handle 144 are all coaxially aligned along the axis 146.

During assembly of the actuator 134, the actuator handle 144 is threaded on the threaded shaft 140 until the second end 150 of the shaft 140 reaches the side openings 158 defined through the actuator handle 144. With the second end 150 of the shaft 140 aligned with the side openings 158, a tool can be inserted through the side openings 158 and used to alter or damage the threads adjacent the second end 150 of the shaft 140. In this way, the altered threads prevent the actuator handle 144 from being completely unthreaded from the shaft 140.

In use of the sealing unit 110, the sealing unit 110 is inserted into the drop cable port 104 of the base 102 while the sealant 130 is in the non-pressurized state of FIG. 7. After the sealing unit 110 has been loaded into the drop cable port 104, the actuator handle 144 is threaded onto the threaded shaft 140 causing the spring 142 to be compressed against the shoulder 166. As the spring 142 is compressed against the shoulder 166 by the actuator handle 144, the shaft 140 is tensioned along its length thereby causing the inner and outer pressurization structures 136, 138 to be forced together such that the sealant 130 is pressurized. FIG. 8 shows the sealant 130 in a pressurized state where the spring 142 has been significantly compressed, thereby causing the sealant 130 to be significantly pressurized between the inner and outer pressurization structures 136, 138. The spring 142 provides extended spring pressure over time that maintains the sealant 130 in a pressurized state.

In certain environments, sand or other particulate contaminants can negatively affect the life of an actuator by causing wear at the internal threads of the actuator handle 144 or the external threads of the shaft 140. Such wear can prevent the sealant 130 from being re-pressurized after an enclosure 100 has been re-entered. To address this issue, the example of FIGS. 1-8 includes sealing components designed to inhibit sand or other particulate material from contaminating the working components of the actuator 134.

In one example, a seal 170 (e.g., an elastomeric seal) is mounted at an outer end 172 of the sleeve 162. The seal 170 includes an outer annular surface 178 that forms a seal with the interior surface of the sleeve 162 and an inner annular surface 180 that forms a seal with the exterior surface of the actuator handle 144. In certain implementations, the seal 170 is annular and surrounds the axis 146. In some implementations, the seal 170 is mounted relative to the sleeve 162 such that during actuation of the sealing unit 110, the seal 170 does not move axially relative to the sleeve 162 or the shaft 140 and also does not rotate about the axis 146. The seal 170 can include notches 174 that receive tabs 176 of the sleeve 162 to prevent relative rotation between the seal 170 and the sleeve 162 about the axis 146. In other implementations, the seal 170 is not keyed to the sleeve 162. In use, the seal 170 functions as a radial seal and is radially compressed within the sleeve 162 between the exterior surface of the actuator handle 144 and the interior surface of the sleeve 162.

When the sealant 130 is not pressurized as shown at FIG. 7, the side openings 158 in the actuator handle 144 are positioned outside the seal 170. During pressurization of the sealant 130, the actuator handle 144 is threaded on the shaft 140 causing the actuator handle 144 to move inwardly along the axis 146 to cause compression of the spring 142. As the actuator handle 144 moves inwardly along the axis 146, the actuator handle 144 slides through the seal 170. The actuator handle 144 continues to be threaded onto the shaft 140 and into the sleeve 162 until the side openings 158 have moved far enough inside the sleeve 162 to be positioned inside of the seal 170. In this way, the seal 170 forms a ring seal that prevents sand or other contaminants from entering the sleeve 162 and contaminating the threads. Additionally, since the side openings 158 are positioned axially inside of the seal 170, the side openings 158 do not provide an entry point for allowing sand or other debris to enter the interior of the actuator handle 144 or the interior of the sleeve 162. FIG. 8 shows the actuator handle 144 threaded onto the shaft 140 to a location where the side openings 158 are positioned inside of the seal 170.

Referring still to FIGS. 7 and 8, the second end 160 of the actuator handle 144 has an open configuration that is useful in facilitating the manufacture of the actuator handle 144. To prevent sand or other contaminants from entering the interior of the actuator handle 144 through the second end 160, a plug 182 is inserted into the second end 160 of the actuator handle 144 so as to effectively seal and close the second end 160. In certain examples, the plug 182 has an elastomeric construction and is inserted into the second end 160 of the actuator handle 144 so as to provide annular sealing against the interior surface of the handle 144.

From the forgoing detailed description, it will be evident that modifications and variations can be made without departing from the spirit and scope of the disclosure.

LIST OF REFERENCE NUMERALS AND CORRESPONDING FEATURES 100 cable closure
102 base
104 drop cable ports
105 dome
108 cable organizer
107 feeder cables
109 drop cables
110 sealing unit
111 optical fibers
120 retention arrangement
130 sealant
132 cable ports
134 actuator
136 inner pressurization structure
138 outer pressurization structure
140 shaft
142 spring
144 actuator handle
146 axis
148 first end of shaft
150 second end of shaft
152 internally threaded portion
154 internally non-threaded portion
156 first end of handle
158 side openings
160 second end of handle
162 sleeve
164 spring receptacle
166 shoulder
170 seal
172 outer end of sleeve
174 notches
176 tabs
178 outer annular surface
180 inner annular surface
182 plug

What is claimed is:

1. A sealing unit comprising:
inner and outer pressurization structures, the outer pressurization structure including a sleeve;
sealant positioned between the inner and outer pressurization structures;
a shaft that is anchored to the inner pressurization structure and that extends through the outer pressurization structure and the sleeve, the shaft extending along an axis;
a spring that surrounds the shaft and that is positioned within the sleeve;
an actuator handle that is threaded onto the shaft to compress the spring and cause the sealant to be pressurized between the inner and outer pressurizations structures; and
a sealing member that surrounds the axis and forms a seal between the sleeve and the actuator handle.

2. The sealing unit of claim 1, wherein the sealing member forms a radial seal between an interior surface of the sleeve and an exterior surface of the actuator handle.

3. The sealing unit of claim 1, wherein the sealing member remains axially fixed relative to the sleeve as the actuator handle is threaded on the shaft.

4. The sealing unit of claim 1, wherein the actuator handle moves axially relative to the sealing member as the actuator handle is threaded on the shaft.

5. The sealing unit of claim 1, wherein the sealing member and the sleeve include mating notches and tabs that prevent relative rotation between the sealing member and the sleeve.

6. The sealing unit of claim 1, wherein the actuator handle defines at least one side opening that is positioned sufficiently within the sleeve so that the sealing member is disposed between the side opening and an exterior of the sleeve when the sealant is in a pressurized state.

7. The sealing unit of claim 1, wherein the actuator handle is hollow, wherein the actuator handle has a first end threaded on the shaft and a second end enclosed by a sealing plug.

8. The sealing unit of claim 1, whereon the sealing unit is configured to mount within a drop cable port defined by a base.

9. The sealing unit of claim 1, whereon the sealing unit is configured to mount within a single opening defined by a base.

* * * * *